United States Patent [19]

McClellan

[11] Patent Number: 4,530,478
[45] Date of Patent: Jul. 23, 1985

[54] INSULATING PIPE SUPPORT APPARATUS

[75] Inventor: William F. McClellan, San Jose, Calif.

[73] Assignee: Pipe Shields, Inc., Vacaville, Calif.

[21] Appl. No.: 594,423

[22] Filed: Mar. 28, 1984

Related U.S. Application Data

[63] Continuation of Ser. No. 375,352, May 6, 1982.

[51] Int. Cl.³ .............................................. F16L 3/00
[52] U.S. Cl. ..................................... 248/62; 138/106; 138/149; 138/157; 248/55
[58] Field of Search ........................... 248/55, 56, 62; 138/106, 107, 140, 147, 149, 157; 206/3

[56] References Cited

U.S. PATENT DOCUMENTS 3,530,899  9/1970  Breeding .............................. 248/62
4,128,219  12/1978  Kaigler ................................ 248/55

Primary Examiner—William H. Schultz
Assistant Examiner—Ramon O. Ramirez
Attorney, Agent, or Firm—Thomas E. Schatzel

[57] ABSTRACT

An insulating pipe support apparatus including a pipe support and a means for distributing load on the pipe support. The pipe support includes a frame having a plurality of insulating inserts on its interior and at least one insert being a load-bearing insert. The load-distributing means includes a base generally parallel to the longitudinal axis of the support and straps surrounding each load-bearing insert on the exterior of the frame and the straps being connected to the base, so that the load borne by the load-bearing insert is transferred to the base via the straps and distributed throughout the base.

15 Claims, 5 Drawing Figures

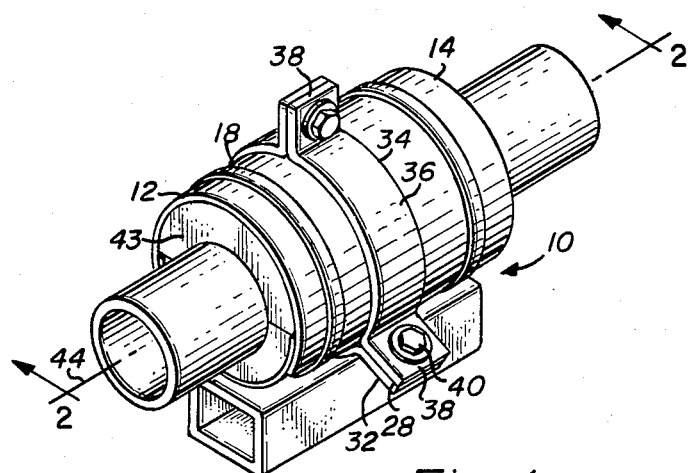
Fig_1
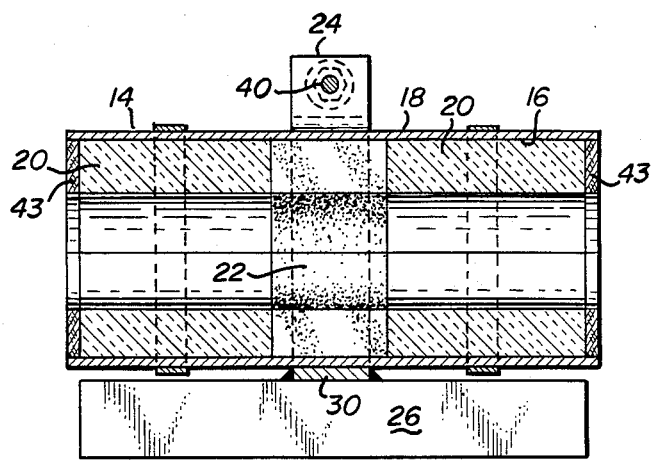
Fig_2
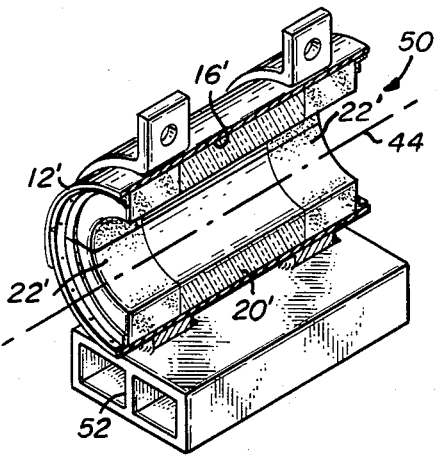
Fig_3

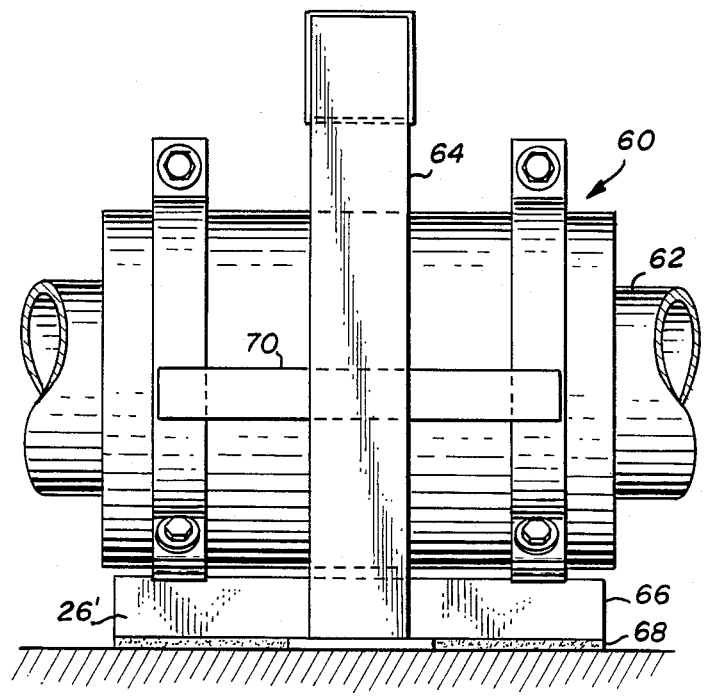
Fig_4
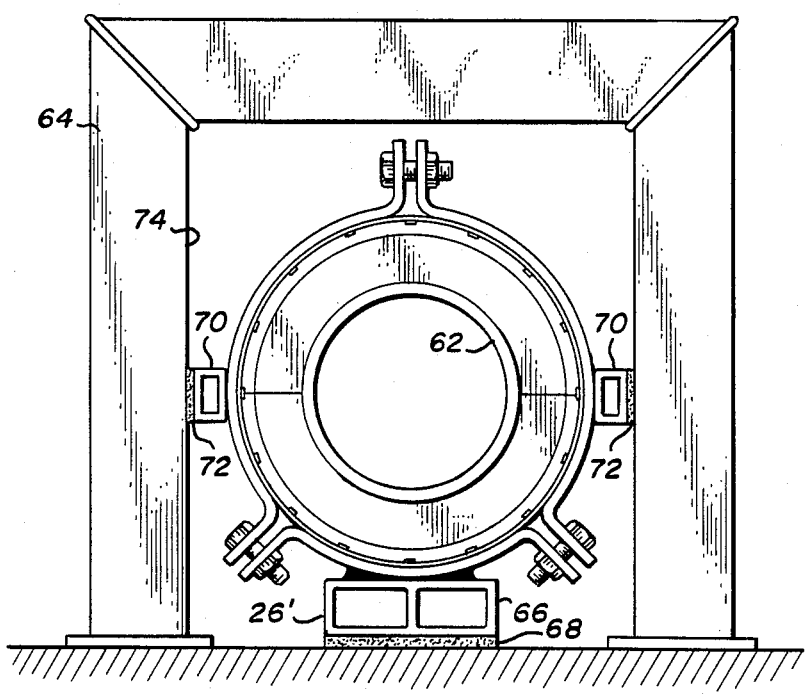
Fig_5

INSULATING PIPE SUPPORT APPARATUS

This application is a continuation of application Ser. No. 375,352, filed 5/6/82.

BACKGROUND OF THE INVENTION

1. Field of the Invention

This invention relates to an apparatus for supporting elongated structures and more particularly to an insulating pipe support apparatus which includes a structure for distributing load borne by the pipe support.

2. Description of the Prior Art

In the construction of various types of facilities, such as nuclear power plants, oil refineries, petrochemical plants, fossil fuel plants, and paper and pulp plants, large diameter (greater than 6 inches) pipes are used to carry high temperature (greater than 400° F.) fluids. Frequently, such pipes are used to carry such fluids under high pressure, as much as 1,000 psi and greater. Additionally, in the construction of certain types of plants, such as nuclear power plants, seismic requirements, promulgated by the federal government for possible natural disasters (e.g., earthquakes), must be met. As is well documented in the State of California, failure to meet such seismic requirements for earthquake conditions can delay the opening of nuclear power plants for months, causing tremendous cost overruns as well as other problems.

Frequently, large diameter pipes, as described above, rest on racks. Longitudinal movement of such pipes is caused by the expansion and contraction of the pipes as fluids are heated and cooled in the pipes. Typically, longitudinal movement of the pipes is between 6 and 12 inches and as much as 53 inches of movement has been experienced. It is required that pipe supports supporting such pipes not slide off their racks, as severe damage to the pipe can result, causing a rupture of the pipe line.

The marked increase in energy costs has caused the end users of the aforementioned facilities to consider carefully their energy requirements before building a pipe line. Construction of pipe lines in the industries mentioned above typically involves the use of many pipe supports. Welded pipe supports are a primary focal point of energy conservation because of the heat loss at each support. If the pipe support is not insulated, energy costs are greatly increased. For example, if fluid in the pipe is 900° F., the typical T-clamp support would be 700° F., and the rack, 500° F. As can be appreciated, large amounts of energy are wasted heating the supports and their racks. Such energy losses are further magnified by environmental conditions such as cold temperature and wind factors.

As a solution to the increased energy costs, a pipe support, McClellan U.S. Pat. No. 4,323,088 (hereinafter McClellan '088), which is incorporated by reference herein, was developed. The McClellan '088 pipe support includes the use of alternating inserts of insulating material and insulating load-bearing material. McClellan '088 is primarily designed for small diameter pipes which are suspended as set forth therein. The typical load-bearing force on such a support is 3,000 to 4,000 psi.

As briefly mentioned above, current pipe supports for large diameter pipes include a T-clamp welded to the underside of the pipe. The T-clamp rests on the rack. Clips are attached to the rack and guide the longitudinal movement of the T-clamp with respect to the rack in response to the expansion and contraction of the pipe, while preventing lateral movement of the T-clamp with respect to the rack.

The welded T-clamp pipe support has the disadvantage of metal-to-metal contact with the heated pipe which results, as described above, in heat loss at every support and rack. Additionally, the welding operation of such a support typically takes two days to complete. In very high temperature pipe lines, where the temperatures are often 700° F., chrome molybdenum alloys are used for pipe construction. It is well known that welding chrome molybdenum alloy can cause stress points. Considering the expense of such pipes and the dangerous consequences of failure of such pipes, welding is a most undesirable means for attaching a pipe support to such pipes.

SUMMARY OF THE PRESENT INVENTION

An object of the present invention is to provide an insulating pipe support for large diameter pipes, wherein the fluid transported within the pipe is hot and under high pressure.

Another object of the present invention is to provide a non-welded insulating pipe support for large diameter pipes which carry high temperature fluids under high pressure.

The apparatus of the instant invention includes an insulating pipe support with a frame having a plurality of insulating inserts abutting each other along the longitudinal axis of the support, at least one, but fewer than all of the inserts, being of strong compression-resistant insulating material. Said insert defines a load-bearing insert. The apparatus further includes a means for distributing a load on the pipe support located on the exterior of the frame. The load-distributing means includes strap means surrounding the load-bearing insert for transferring the load borne by that insert to a base member which is generally parallel to the longitudinal axis of the support. This construction provides a means for transferring the load borne load-bearing insert to the base member and distributing that load along the base member.

It is preferable for the frame to include at least two load-bearing inserts for more even distribution of the load and to provide a pipe support with greater strength. It is further preferable to include a frame with the load-bearing insert at the ends of the frame with an insulating insert between the load-bearing inserts. In fact, an embodiment of same has been constructed and found to resist measurable compression even when the load applied to the pipe exceeded 100,000 lbs.

In particular applications; e.g., large diameter oil refinery pipes, the aforementioned pipe support will rest on a rack. As the pipe expands and contracts due to fluid inside being heated and cooled, the pipe will typically move six (6) to twelve (12) inches. In this application, it is preferable for the pipe support to include a generally rectangular, hollowed base having a surface which mates with the rack surface so as to provide the minimum amount of friction contact, thereby encouraging pipe movement, but allowing the pipe to move in the desired direction with respect to the rack.

The instant invention is primarily directed at high temperature pipe applications, as set forth above. In those applications, high temperature load-bearing insulation materials will be used. However, the non-welded structure of the instant invention, in particular, makes the instant invention particularly suitable for certain low temperature applications, as set forth above. In low temperature applications, low temperature load-bearing insulation materials will be used.

In other applications, the large diameter pipes may be set on a rack within a frame where it is desirable to further limit the movement of the pipe. When such is an objective, the instant pipe support is preferably provided with a pair of radially outwardly extending means which contact the frame walls for guiding and aligning the pipe support within the frame. The preferred guide means are 180° apart. It is further preferred that such guide and alignment means include a mating surface with the frame walls such that the pipe support can move freely relative to the frame.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a perspective view of an insulating pipe support apparatus in accordance with this invention.

FIG. 2 is a cross-sectional view along the line 2—2 of FIG. 1.

FIG. 3 is a perspective partially-sectioned view of an alternative embodiment of the present invention.

FIG. 4 is a side view of another embodiment of an insulating pipe support apparatus in accordance with this invention, mounted in a frame and resting on a rack.

FIG. 5 is a front view of FIG. 4 illustrating the guide and alignment structure of the insulating pipe support apparatus of FIG. 4.

DETAILED DESCRIPTION OF THE PREFERRED EMBODIMENT

Illustrated in FIG. 1 and FIG. 2, and denoted by the general reference numeral 10, is an insulating pipe support apparatus of the preferred embodiment. The apparatus provides support and insulation to pipe lines carrying fluids which have a temperature markedly different from the ambient air temperature surrounding the pipe. Compared with McClellan '088, this pipe support apparatus is designed for large diameter pipes (i.e., greater than 6 inches), where pressures exceed 1,000 psi.

The apparatus 10 includes a cylindrical pipe support 12 including a frame 14 having an interior 16 and an exterior 18. The support 12 includes a plurality of alternating abutting inserts. The first type of insert is an insulating insert 20. As can be seen, in the preferred embodiment of FIG. 3, there are two such inserts 20. These inserts 20 are made from a material having extremely high insulating properties and reasonable load-carrying properties. The preferred material is calcium silicate.

The support includes a second type of insert, a load-bearing insert 22. The load-bearing insert 22 is between the insulating inserts 20, and the load-bearing insert 22 is centrally located around the midpoint of the support 12 for more even load distribution, as will be more apparent hereinafter. The load-bearing insert 22 is made from a high density material with excellent load-carrying characteristics. Preferred load-bearing material is from the marimet family and particularly marinite.

A more detailed explanation of the general construction of the preferred pipe support for the embodiment shown in FIGS. 1 and 2 is found in McClellan '088 which is incorporated herein by reference. Of course, the pipe support of McClellan '088 is not designed for the same diameter pipe or design loads, but the general construction of the pipe support of McClellan '088 is the same as in this embodiment.

The insulating pipe apparatus 10 includes a means for distributing the load borne by the pipe support 12 and particularly the load-bearing insert 22. The load-distributing means includes a strap means 24 surrounding the load-bearing insert 22 on the exterior 18 of the frame 14 for transferring the load borne by the load-bearing insert 22 to a base member 26.

The strap means 24 includes a first member 28, shaped like an upside-down "W", having its middle portion 30 welded to the base member 26. The first member 28 includes side flanges 32 having openings to permit the other strap members to be connected thereto. The strap means 24 includes second members 34, also generally in the shape of a "W", with their middle portions 36 surrounding the load-bearing insert 22 and having side flanges 38 with openings mating as shown with each other and the first member 28. The strap means 24 further includes bolts 40 which thread through the respective side flange openings for firmly securing the strap means 24 to the pipe support 12 without welding.

As set forth in McClellan '088, the pipe support 12 preferably includes a cover 43 for the front and rear of the support. Additionally, the inserts 20 and 22 are preferably glued to the frame interior 16. Cover 43 provides additional structural support for the pipe and may include weather-stripping material when environmental conditions dictate.

The base member 26 is preferably an elongated hollow rectangle which is parallel to the longitudinal axis 44 of the support. The strap means 24 and the base member 26 are preferably made from very strong material with excellent load-carrying characteristics defined by engineering parameters and construction standards, carbon steel or stainless steel as dictated by environmental conditions being preferred.

With particular reference to FIG. 3, there is shown an alternative insulating pipe support in accordance with this invention denoted generally by the reference number 50. Apparatus 50 is exactly like apparatus 10 with the following exceptions. Firstly, the frame interior 16' includes two load-bearing inserts 22 at either end of the support 12' and an insulating insert 20 between the inserts 22. This is preferred to the earlier described embodiment because the load is more evenly distributed throughout the base member. In apparatus 50, the base member includes a septum 52 dividing the hollow rectangle into two hollow rectangles. This base construction is preferred because greater loads may be carried by the base.

FIGS. 4 and 5 illustrate another embodiment of the apparatus in accordance with this invention, generally denoted by the reference numeral 60 supporting a pipe 62 within a frame 64 with the apparatus 60 resting on a rack 66.

Apparatus 60 is precisely like the above-described apparatus 50 with the following exceptions. Firstly, apparatus 60 includes a bridge-bearing pad 68 on the base 26' which contacts the rack 66. The bridge-bearing pad 68 decreases friction between the pipe support and rack 66, consequently lowering stress created by expansion and contraction of the pipe. However, the pad 68 can and does move with respect to the rack 66 as fluid in the pipe is heated and cooled. Where it is desirable to have the support slide easily with respect to the rack, the pad 68 surface is made from Teflon ® or similar material.

Additionally, the pipe support 12' includes radially outwardly extending members 70 which define alignment and guide means for aligning and guiding the pipe support 12' in the rack 66 as the pipe moves with the expanding and contracting fluids within it. Where it is desirable, the surface of the alignment and guide means includes a coating of Teflon ® or other similar material on the exterior surface 72 which contacts the frame walls 74, thereby defining a slide surface. Preferably the alignment and guide means 70 are spaced 180° apart and contact opposite frame walls 74. The means 70 combined with the frame walls 74 prevents too much lateral movement of the pipe 62.

Although the present invention has been described above in terms of the presently preferred embodiments, it should be understood that such disclosure is not considered to be limiting. Accordingly, it is intended that the appended claims be interpreted as covering all alterations and modifications, all with the true spirit and scope of the invention.

What is claimed is:

1. An insulating pipe support apparatus comprising:
    a support for pipes which undergo longitudinal movement caused by thermal distortion including a cylindrical frame having an interior with at least one high compressive-strength thermally insulating insert, said insert being of a strong, compression resistant material, said insert defining a ring adapted to snugly receive through its central aperture a pipe for carrying fluids, which vary greatly from an ambient temperature;
    means for distributing load on the pipe support, the means located on the exterior of the frame and including a base member generally parallel to the support longitudinal axis and extending the entire length of the support, said base member being adapted to slidably rest on a pipe rack, whereby said base member may travel along a longitudinal axis of said pipe, and a strap means connected to the base member and engaged in a 360° compression contact with the exterior of the frame for transferring the load borne by the load-bearing insert to the base member, whereby the load borne by the load bearing insert is transferred from that insert to the base member through the strap means throughout the range of the pipe's longitudinal travel, thereby distributing the load throughout the base member.

2. An insulating pipe support apparatus, comprising:
    a support for pipes which undergo longitudinal movement caused by thermal distortion including a cylindrical frame having an interior with at least three high compressive-strength, thermally insulating inserts abutting each other about a longitudinal axis of support, at least one of the inserts being of a strong compression resistant material defining a load bearing insert, and at least two of the inserts being of a thermally insulating material, each of said inserts defining a ring adapted to snugly receive through its central aperture a pipe for carrying fluids which vary greatly from an ambient temperature; and
    means for distributing load on the pipe support, the means located on the exterior of the frame and including a base member generally rectangular in shape and generally parallel to the support longitudinal axis and extending the entire length of the support, said base member being adapted to slidably rest on a pipe rack whereby said base member may travel along a longitudinal axis of said pipe, and a first strap means comprising a single strap connected to the base member about a single point thereof and engaged in a 360° compression contact with the exterior of the frame for transferring the load borne by the load bearing insert to the base member, whereby the load borne by the load bearing insert is transferred from that insert to the base member through the first strap means throughout the range of the pipe's longitudinal travel, thereby distributing the load throughout the base member.

3. The apparatus as set forth in claim 2 wherein:
    the exterior of the pipe support includes means for guiding and aligning the pipe support in said pipe rack, said means including two radially outwardly extending members, spaced approximately 180° apart and approximately 90° with the base support.

4. The apparatus as set forth in claim 3 wherein the guide means includes an exterior surface defining a slide surface.

5. The apparatus as set forth in claim 2 wherein the thermally insulating material includes high density urethane.

6. The apparatus of claim 2 wherein,
    the load bearing insert is made of marinite and the insulating inserts are made from calcium silicate.

7. The apparatus of claim 2, and further including,
    a second strap means connected to the base and engaged in a 360° compression contact with the pipe.

8. The apparatus of claim 2 wherein,
    said ring includes a wall having a radial thickness at least one-quarter as thick as a diameter of a pipe inserted therethrough.

9. An insulating pipe support apparatus, comprising:
    a support for pipes which undergo longitudinal movement caused by thermal distortion including a cylindrical frame and having an interior with at least three high compressive-strength, thermally insulating inserts abutting each other along a longitudinal axis of support, the interior including at least two inserts being of a strong compression resistant material defining a load bearing insert, and at least one insert being of a thermally insulating material, said thermally insulating insert located intermediate to the load bearing inserts, each of said inserts defining a ring adapted to snugly receive through its central aperture a pipe for carrying fluids which vary greatly from an ambient temperature; and
    means for distributing load on the pipe support, the means located on the exterior of the frame and including a base member generally rectangular in shape and generally parallel to the support longitudinal axis and extending the entire length of the support, said base member being adapted to slidably rest on a pipe rack whereby said base member may travel along a longitudinal axis of said pipe and a first strap means comprising a single strap connected to the base member about a single point thereof and engaged in a 360° compression contact with the exterior of the frame for transferring the load borne by the load bearing insert to the base member, whereby the load bearing insert is transferred from that insert to the base member through the strap means throughout the range of the pipe's longitudinal travel, thereby distributing the load throughout the base member.

10. The apparatus as set forth in claim 9 wherein the exterior of the pipe support includes means for guiding and aligning the pipe support in a pipe rack, said means including two radially outwardly extending members, spaced approximately 180° apart and approximately 90° with the base support.

11. The apparatus as set forth in claim 10 wherein the guide means includes an exterior surface defining a slide surface.

12. The apparatus as set forth in claim 9 wherein the thermally insulating material includes high density urethane.

13. The apparatus of claim 9 wherein, the load bearing inserts are made of marinite and the remaining inserts are made from calcium silicate.

14. The apparatus of claim 9 further including, a second strap means connected to the base and engaged in a 360° compression contact with the pipe.

15. The apparatus of claim 9 wherein, said ring includes a wall having a radial thickness at least one-quarter as thick as a diameter of a pipe inserted therethrough.

* * * * *